Patented June 29, 1943

2,322,925

UNITED STATES PATENT OFFICE 2,322,925

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application December 11, 1941, Serial No. 422,541

15 Claims. (Cl. 260—154)

This invention relates to new azo compounds and their application to the art of dyeing or coloring. Textile materials such as organic derivatives of cellulose, wool, silk, "Nylon" and "Vinyon" and lacquers composed of cellulose esters, cellulose ethers and vinyl derivatives, for example, can be colored. Coloration can be effected by dyeing, printing, stenciling or other suitable methods.

Typical organic derivatives of cellulose include the hydrolyzed as well as the unhydrolyzed cellulose organic acid esters such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose. While the process of my invention will be illustrated more particularly in connection with the coloration of cellulose acetate, a material which is especially adapted to be colored by the nuclear non-sulfonated dye compounds of my invention, it will be clearly understood that the dye compounds of my invention can be used to color other organic derivatives of cellulose such as those just mentioned as well as the other materials named.

It is an object of my invention to provide a new class of azo compounds. Another object of my invention is to provide colored textile materials which are of good fastness to light and washing. A further object is to provide a process for the direct coloration of organic derivatives of cellulose, wool, silk, "Nylon" and "Vinyon" textile materials. A particular object of my invention is to provide a new class of nuclear non-sulfonated azo compounds suitable for the coloration of cellulose acetate silk.

The azo compounds of my invention, by means of which the above objects are accomplished or made possible, consist of the azo compounds having the formula:

$$R\!-\!N\!=\!N\!-\!R_1$$

wherein R represents the residue of a member selected from the group consisting of an aryl nucleus of the benzene series, an aryl nucleus of the naphthalene series, a benzothiazole nucleus and a benzoxazole nucleus and $R_1$ represents the residue of a 1,2,3,4-tetrahydrocinnoline coupling component joined through the carbon atom in its 6-position to the azo bond.

While my invention relates broadly to the azo compounds having the above formula, it relates more particularly to the azo compounds having the formula:

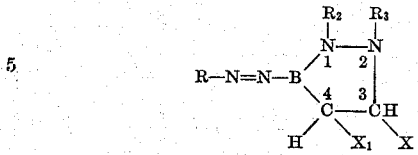

wherein R represents the residue of a member selected from the group consisting of an aryl nucleus of the benzene series, an aryl nucleus of the naphthalene series, a benzothiazole nucleus and a benzoxazole nucleus, B represents the residue of a benzene nucleus, $R_2$ and $R_3$ each represents a member selected from the group consisting of hydrogen, an acyl group, an alkyl group, a furyl group and a short chain unsaturated hydrocarbon group, X and $X_1$ each represents a member selected from the group consisting of hydrogen, an alkyl group and a hydroxy group, wherein at least one of $R_2$ and $R_3$ must be a substituent other than hydrogen, and wherein the nitrogen atom numbered 1 and the carbon atom numbered 4 are attached to adjacent carbon atoms of the benzene nucleus B which are in para and meta position, respectively, to the azo bond.

Compounds wherein R is a benzene nucleus appear to be advantageous. Further, normally at least one of the members $R_2$ and $R_3$ is a substituent other than hydrogen. Ordinarily, X and $X_1$ are hydrogen although they can also be alkyl or hydroxy as indicated. Usually at least one of the members $R_2$ and $R_3$ represents an alkyl group especially a hydroxyalkyl group.

Compounds wherein the diazo component is derived from an amine having the general formula:

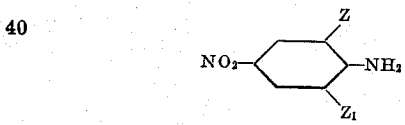

wherein Z and $Z_1$ each represents a member selected from the group consisting of hydrogen, a halogen atom, a nitro, an alkylsulfone, a sulfonamide, a hydroxy, an alkoxy, an alkyl, a cyano, an alkylketo and a —COOY group wherein Y represents a member selected from the group consisting of hydrogen, an alkyl group and an alkali-forming metal appear to be particularly advantageous.

The term "alkyl," as used herein and in the claims, unless otherwise indicated, includes not only unsubstituted alkyl groups such as the methyl group, the ethyl group, a propyl group or a butyl group but also substituted alkyl groups, such as β-hydroxethyl, β-hydroxypropyl, β,γ-dihydroxypropyl, Δ-hydroxybutyl and the ethers thereof such as β-methoxyethyl, β-ethoxyethyl, Δ-methoxybutyl and γ-methoxypropyl as well as the esters thereof such as the methyl or ethyl esters. Similarly, alkyl groups substituted by halogen or cyano, such as β-chloroethyl, γ-chloropropyl, β-iodoethyl, β-cyanoethyl and γ-cyanopropyl are included. Further, alkyl groups substituted with a sulfonic, sulfato or acid ester of phosphorus group such as β-sulfoethyl, γ-sulfopropyl, β-sulfatoethyl, γ-sulfatopropyl, Δ-sulfatobutyl, β-phosphatoethyl, γ-phosphatopropyl and γ-phosphatopropyl are likewise included.

The term "alkoxy" as used herein, unless otherwise indicated, includes alkoxy groups such as methoxy, ethoxy, propoxy, butoxy, β-methoxyethoxy, and β-ethoxyethoxy, for example. Illustrative of a furyl group may be mentioned furfuryl, tetrahydrofurfuryl, 5-ethylfurfuryl, 5-β-hydroxyethyltetrahydrofurfuryl and 5 - ethyltetrahydrofurfuryl. Illustrative alkali-forming metals include, for example, sodium, potassium, calcium and ammonium. Again, it will be understood that the nuclei represented by R, R₁ and B include substituted nuclei as illustrated herein.

Both sulfonated and non-sulfonated compounds are included within the scope of my invention. The nuclear non-sulfonated compounds have been found to be especially of value for the dyeing of organic derivatives of cellulose and it is to these compounds and their application for the dyeing of organic derivatives of cellulose that my invention is especially directed. These nuclear non-sulfonated compounds likewise possess some application for the dyeing of wool, silk "Vinyon" and "Nylon". For the dyeing of cellulose acetate silk, nuclear non-sulfonated dye compounds, wherein R is the residue of a benzene nucleus, are generally advantageous.

The nuclear sulfonated compounds of my invention have little or no utility for the dyeing of organic derivatives of cellulose but possess application for the dyeing of wool and silk. Preferably, when the dye compounds of the invention are to be employed for the coloration of organic derivatives of cellulose, they should contain no nuclear free carboxylic acid group. Colors ranging from yellow to blue-green can be obtained.

The azo compounds of my invention can be prepared by diazotizing diazotizable members selected from the group consisting of an arylamine of the benzene series, an aminonaphthalene, an aminobenzothiazole and an aminobenzoxazole and coupling the diazonium compounds obtained with 1,2,3,4-tetrahydrocinnoline compounds having no substituent which would prevent their coupling.

The following examples illustrate the preparation of the azo compounds of my invention:

Example 1

.1 gram mole of p-aminophenylmethylsulfone is diazotized in known fashion and the diazonium compound obtained is added to a cooled dilute hydrochloric acid solution of 1,2-di-β-hydroxyethyl-1,2,3,4-tetrahydrocinnoline. The diazonium solution is added slowly with stirring while maintaining the temperature of the reaction mixture at about 0–10° C. The coupling reaction which takes place is completed by adding sodium acetate until the solution is just neutral to Congo red paper. The dye compound is recovered by filtration, washed with water and dried. It colors cellulose acetate silk red.

Example 2

.1 gram mole of 1-amino-2-chloro-4-nitrobenzene is diazotized and the diazonium compound obtained is coupled with .1 gram mole of 1,2-di-β-hydroxyethyl-7-methyl-1,2,3,4-tetrahydrocinnoline. Coupling and recovery of the compound formed can be carried out in accordance with the general method described in Example 1. The dye compound obtained colors cellulose acetate silk a rubine shade.

.1 gram mole of 1,2-di-γ-hydroxypropyl-7-methyl-1,2,3,4-tetrahydrocinnoline can be substituted for the coupling compound of the example to obtain a dye compound which similarly colors cellulose acetate silk a rubine shade.

Example 3

.1 gram mole of p-aminoazobenzene containing a hydroxy group in the ortho position to the amino group is diazotized and the diazonium compound obtained is coupled with .1 gram mole of 1-β-sulfatoethyl - 7 - hydroxy-1,2,3,4-tetrahydrocinnoline. The dye compound obtained colors cellulose acetate silk red. Because of the presence of a hydroxy group in ortho position to the azo bond, it will be understood that the dye compound can be chromed if desired. It will be understood that the β-sulfatoethyl group can be in the form of a salt such as its sodium, potassium or ammonium salt form, for example.

Example 4

.1 gram mole of p-nitrobenzeneazo-1-β-hydroxyethyl-2-aceto-1,2,3,4-tetrahydrocinnoline is suspended in water, heated to 60–80° C. and reduced by the addition of .4 gram mole of sodium sulfide. After completion of the reduction reaction, which requires about three hours, the reaction mixture is cooled and the dye compound formed filtered off, washed with water and dried. By the reduction reaction described, the nitro group is reduced to an amino group. The dye compound formed from the reduction reaction colors cellulose acetate silk orange-yellow. Because of the presence of the free amino group, the dye compound may be diazotized on the fabric and developed with 2-hydroxy-3-naphthoic acid, to give colors ranging in shade from navy blue to black depending upon the concentration of the dye on the fiber.

Example 5

.1 gram mole of 1-amino-2,4-dinitro-6-sulfonethylamide is diazotized and the diazonium compound obtained is coupled with .1 gram mole of 1,2-di-β-hydroxyethyl-1,2,3,4-tetrahydrocinnoline. The dye compound obtained in accordance with the procedure hereinbefore described colors cellulose acetate silk blue.

Example 6

.1 gram mole of 2-amino-5-nitrophenylmethylsulfone is diazotized and the diazonium compound obtained is coupled with .1 gram mole of 1,2-di-β-hydroxyethyl-3,7-dimethyl-1,2,3,4-tetrahydrocinnoline. Coupling and recovery of the dye compound formed can be carried out in accordance with the procedure described in Example 1. The dye compound obtained colors cellulose acetate silk violet.

Example 7

.1 gram mole of diazotized p-nitroaniline is coupled with .1 gram mole of 1,2-diallyl-1,2,3,4-tetrahydrocinnoline. The dye compound obtained colors cellulose acetate silk rubine.

Example 8

.1 gram mole of diazotized 1-amino-2-cyano-4-nitrobenzene is coupled with .1 gram mole of 1,2 - dimethyl-1,2,3,4-tetrahydrocinnoline. The dye compound obtained colors cellulose acetate silk rubine.

The following tabulation further illustrates the compounds of my invention together with the color they yield on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in the examples.

any of the coupling components indicated herein to yield dye compounds of the invention.

The tetrahydrocinnoline compounds used in the preparation of the azo compounds defined herein can be prepared as indicated hereinafter.

Cinnoline can be prepared as described in Berichte der Deutschen Chemischen Gesellschaft, vol. 30, pages 524–525 (1897). 1,2,3,4-tetrahydrocinnoline can be obtained by reducing cinnoline or dihydrocinnoline (Ber. vol. 30, page 523) in a pressure autoclave with hydrogen in the presence of a catalyst such as finely divided nickel or platinum. This reduction may also be effected by means of sodium in alcohol or liquid ammonia.

Alkyl groups can be introduced into the 1- and 2-positions of the 1,2,3,4-tetrahydrocinnoline nucleus by known alkylation methods. Thus a $\beta$-hydroxyethyl, a $\beta$-hydroxypropyl, a $\gamma$-hydroxypropyl or a $\beta,\gamma$-dihydroxypropyl can be introduced by treatment with ethylene oxide, propylene oxide, trimethylene oxide and glyceryl chlorhydrin, respectively. Methyl, ethyl and propyl groups, for example, can be introduced

| Amine | Coupling component | Color |
| --- | --- | --- |
| 5-nitro-2-amino-phenylmethylsulfone | 1. 1,2,3,4-tetrahydrocinnoline | Rubine. |
| Do | 2. 1-propionyl-1,2,3,4-tetrahydrocinnoline | Orange. |
| Do | 3. 1,2-di-$\beta$-hydroxyethyl-1,2,3,4-tetrahydrocinnoline | Rubine. |
| Do | 4. 1,2 - ditetrahydrofurfuryl - 1,2,3,4 - tetrahydrocinnoline. | Do. |
| Do | 5. 4-methyl-7-carboxyl-1,2,3,4-tetrahydrocinnoline | Do. |
| Do | 6. 1,2- di-$\beta$- hydroxyethyl-3-hydroxy-1,2,3,4-tetrahydrocinnoline. | Do. |
| Do | 7. 1,2-di-$\beta$-hydroxyethyl-4-hydroxy-1,2,3,4-tetrahydrocinnoline. | Do. |
| Do | 8. 7-chloro-1,2,3,4-tetrahydrocinnoline | Red. |
| Do | 9. 1-phenyl-1,2,3,4-tetrahydrocinnoline | Rubine. |
| 3,5-dinitro-2-aminophenylmethyl-ketone | 1 to 9 above | Reddish-blue to red. |
| 1-amino-2,4-dinitro-6-bromobenzene | do | Do. |
| p-Aminoazobenzene | do | Orange to rubine. |
| 1-amino-2-chloro-4-nitrobenzene | do | Orange to violet. |
| 2-amino-6-methoxy-benzothiazole | do | Orange to rubine. |
| 2-aminobenzothiazole | do | Do. |
| 2-amino-6-methoxy-benzoxzole | do | Do. |
| $\alpha$-Naphthylamine | do | Orange to red. |
| 1-amino-5-hydroxy-naphthalene | do | Do. |
| 1-amino-5-methoxy-naphthalene | do | Do. |
| 1,4-dinitro-6-chloro-benzeneazo-4'-aminobenzene | do | Orange to violet. |
| 1-amino-2,4-dinitro-6-sulfonethylamide | do | Red to blue. |
| 1-amino-2,4-dinitro-6-sulfonmethylamide | do | Do. |
| 1-amino-2-carboxyl-4-nitrobenzene | do | Red to rubine. |
| 1-amino-2,4,6-trinitrobenzene | do | Red to blue. |
| 1-amino-2,6-dichloro-4-nitrobenzene | do | Orange-brown to red-brown. |

Sulfonated amines which can be diazotized and the diazonium compounds obtained coupled with any of the coupling components shown herein to obtain dye compounds of my invention include, for example, p-sulfanilic acid, 1-amino-4-sulfonic naphthalene, 2-amino-8-sulfonic naphthalene, 1-amino-3-sulfonic naphthalene, 1-amino-5 - sulfonic naphthalene, 1 - amino - 6 - sulfonic naphthalene, 1-amino-4,8-disulfonic naphthalene, 1-amino-3,8-disulfonic naphthalene, 1-amino-5-hydroxy-7-sulfonic naphthalene, metanilic acid, 1-amino-2-sulfonic-4-nitrobenzene, 1 - amino - 2,4 - disulfonic benzene, 1 - amino - 2-chloro-4-sulfonic benzene as well as sulfonated aminoazobenzene, aminobenzothiazole and aminobenzoxazole compounds.

To illustrate, diazotized p-sulfanilic acid can be coupled with 1,2-di-$\beta$-hydroxyethyl-1,2,3,4-tetrahydrocinnoline to give a dye compound which colors wool and silk orange-yellow. Similarly, diazotized 1-amino-6-sulfonic naphthalene can be coupled with 1-allyl-1,2,3,4-tetrahydrocinnoline to give a dye compound which colors wool and silk orange.

It will be understood that the foregoing examples are intended to be illustrative and not limitative of my invention. Any of the diazonium compounds indicated herein can be coupled with by reaction with reactants such as methyl sulfate, methyl iodide, ethyl sulfate, ethyl bromide and propyl iodide.

Similarly acyl groups can be introduced into the 1- and 2-positions of the 1,2,3,4-tetrahydrocinnoline nucleus by reaction with an acylating agent such as acetic anhydride, propionic anhydride, butyric anhydride, methyl chlorocarbonate, ethyl chlorocarbonate, nitrourea and potassium cyanate and hydrochloric acid together.

Unsaturated hydrocarbon groups and furyl groups can be introduced into the 1- and 2-positions of the 1,2,3,4-tetrahydrocinnoline nucleus by reaction with allyl bromide, vinyl chloride, crotonyl bromide, furfuryl bromide, tetrahydrofurfuryl bromide and 5-$\beta$-hydroxyethyl tetrahydrofurfuryl bromide.

1,2,3,4-tetrahydrocinnolines containing a hydroxy group in the 4-position can be prepared by reacting a 4-chlorodihydrocinnoline (Ber., vol. 30, page 522) with sodium hydroxide and reducing the compound obtained to a 4-hydroxy-1,2,3,4-tetrahydrocinnoline.

Additional information concerning the preparation of cinnoline compounds from which 1,2,3,4-tetrahydrocinnoline compounds can be prepared will be found in Berichte, vol. 17, pages 722–727, Karrer—Organic Chemistry (1938)

page 748 and Richter's Organic Chemistry—D'Albe vol. III (1923) pages 271 and 272. From the foregoing and the description of the preparation of various tetrahydrocinnoline compounds given hereinafter, the preparation of the tetrahydrocinnoline compounds will be clear to those skilled in the art.

*Preparation of 1,2-di-β-hydroxyethyl-1,2,3,4-tetrahydrocinnoline*

One gram mole of 1,2,3,4-tetrahydrocinnoline and 2.2 gram moles of ethylene oxide are heated together at 160° C. under pressure for 10 hours. Upon cooling, the reaction product is removed and the 1,2-di-β-hydroxyethyl-1,2,3,4-tetrahydrocinnoline formed is removed by distillation under reduced pressure.

*Preparation of 1-β-hydroxyethyl-2-aceto-1,2,3,4-tetrahydrocinnoline*

One gram mole of 1,2,3,4-tetrahydrocinnoline is suspended in water and treated, while stirring, with one gram mole of acetic anhydride, the temperature being maintained below 40° C. The mixture of 2-aceto- and 1-aceto-1,2,3,4-tetrahydrocinnoline obtained is separated by fractional crystallization from alcohol or a water and alcohol mixture. By reaction of the 2-aceto-1,2,3,4-tetrahydrocinnoline compound with ethylene oxide 1-β-hydroxyethyl-2-aceto-1,2,3,4-tetrahydrocinnoline can be obtained. Likewise, by using the 1-aceto-1,2,3,4-tetrahydrocinnoline compound, 1-aceto-2-β-hydroxyethyl-1,2,3,4-tetrahydrocinnoline compound can be obtained.

Similarly, the corresponding β-hydroxypropyl, γ-hydroxypropyl and β,γ-dihydroxypropyl compounds, for example, can be obtained by substituting propylene oxide, trimethylene oxide and glyceryl chlorhydrin, respectively, for ethylene oxide. Likewise, by using a different acylating agent than acetic anhydride, other acyl groups can be introduced in place of the aceto group.

*Preparation of 1-β-sulfatoethyl-7-hydroxy-1,2,3,4-tetrahydrocinnoline*

This compound can be prepared by reacting 7-hydroxy-1,2,3,4-tetrahydrocinnoline with sodium-β-chloroethylsulfate at 100° C. After 4 hours the mixture is made alkaline with sodium carbonate and any unreacted 7-hydroxy-1,2,3,4-tetrahydrocinnoline is removed by distillation with steam. 1-β-sulfatoethyl-7-hydroxy-1,2,3,4-tetrahydrocinnoline can be separated from the reaction mixture by fractional crystallization from alcohol.

*Preparation of 4-methyl-7-carboxyl-1,2,3,4-tetrahydrocinnoline*

This compound can be prepared by hydrogenating 4-methyl-7-carboxylcinnoline the preparation of which is described in Berichte, vol. 17, page 722–727 until the 1,2,3,4-tetrahydrocinnoline compound is obtained.

*Preparation of 5-amino-1,2,3,4-tetrahydrocinnoline and 5-methylamino-1,2,3,4-tetrahydrocinnoline*

This compound can be prepared by reacting 5-nitrocinnoline with hydrogen sulfide in an alcoholic ammonia medium, the desired compound being recovered by distillation. 5-methylaminocinnoline can be prepared from the 5-aminocinnoline thus obtained by treatment with one molecular equivalent weight of methyl sulfate and two molecular equivalent weights of sodium hydroxide at 60–80° C.

5-aminocinnoline and 5-methylaminocinnoline can be reduced to the corresponding 1,2,3,4-tetrahydrocinnoline compounds by reducing with hydrogen in alcohol in the presence of finely divided nickel at room temperature under pressure. By methods previously indicated, the 1 and 2 positions of the tetrahydrocinnoline nucleus can be substituted with various substituents disclosed herein. Thus, it is apparent how various 1,2,3,4-tetrahydrocinnoline compounds containing an amino or alkylamino group in the 5-position can be prepared.

It is here noted that the term "Nylon" refers to a linear polyamide resin which is believed to be basically described or claimed in U. S. Letters Patent 2,071,250, issued February 16, 1937, to Wallace H. Carothers. The term "Vinyon" refers to a vinyl chloride-vinyl acetate copolymer. This material is more completely identified at pages 73 and 74 of "Synthetic Organic Chemicals," 10th edition, published October 15, 1940, by Carbide & Carbon Chemicals Corporation.

The nuclear non-sulfonated azo compounds of my invention are, for the most part, relatively insoluble in water. They can be advantageously directly applied to the textile materials named herein in the form of an aqueous suspension which can be prepared by grinding the dye to a paste in the presence of a sulfonated oil, soap or other suitable dispersing agent and dispersing the resulting paste in water.

Direct dyeing operations can, with advantage, be conducted at temperatures of about 75–85° C. but any suitable temperature may be used. Thus, the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents, together with the amounts that may be employed, are disclosed in McNally and Dickey Patent No. 2,115,030, issued April 26, 1938. The process disclosed in this patent for the dyeing of cellulose acetate silk can be used in applying the nuclear non-sulfonated dyes of the present application to this material specifically as well as the other textile materials named herein.

The nuclear sulfonated dye compounds can be applied for the dyeing of wool and silk by methods known in the art for the dyeing of these materials. They can, for example, be applied directly to wool and silk by the method disclosed for the coloration of cellulose acetate silk, except that in many cases the dye will be sufficiently soluble as to render the use of a dispersing agent unnecessary. It is here noted that, while colors yielded by the nuclear non-sulfonated dye compounds have been given primarily with reference to cellulose acetate silk, the other materials named herein are colored generally similar shades.

I claim:
1. The azo compounds having the formula:

wherein R represents the residue of a member selected from the group consisting of an aryl nucleus of the benzene series, an aryl nucleus of the naphthalene series, a benzothiazole nucleus and a benzoxazole nucleus and $R_1$ represents the residue of a 1,2,3,4-tetrahydrocinnoline coupling component joined through the carbon atom in its 6-position to the azo bond.

2. The azo compounds having the formula:

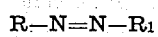

wherein R represents the residue of a benzene nucleus and $R_1$ represents the residue of a 1,2,3,4-tetrahydrocinnoline coupling component joined through the carbon atom in its 6-position to the azo bond.

3. The azo compounds having the formula:

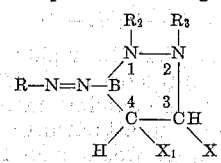

wherein R represents the residue of a member selected from the group consisting of an aryl nucleus of the benzene series, an aryl nucleus of the naphthalene series, a benzothiazole nucleus and a benzoxazole nucleus, B represents the residue of a benzene nucleus, $R_2$ and $R_3$ each represents a member selected from the group consisting of hydrogen, an acyl group, an alkyl group, a furyl group and a short chain unsaturated hydrocarbon group, X and $X_1$ each represents a member selected from the group consisting of hydrogen, an alkyl group and a hydroxy group, wherein at least one of $R_2$ and $R_3$ must be a substituent other than hydrogen, and wherein the nitrogen atom numbered 1 and the carbon atom numbered 4 are attached to adjacent carbon atoms of the benzene nucleus B which are in para and meta position, respectively, to the azo bond.

4. The azo compounds having the formula:

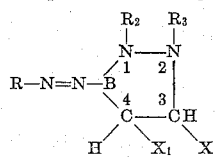

wherein R represents the residue of an aryl nucleus of the benzene series, B represents the residue of a benzene nucleus, $R_2$ and $R_3$ each represents a member selected from the group consisting of hydrogen, an acyl group, an alkyl group, a furyl group and a short chain unsaturated hydrocarbon group, X and $X_1$ each represents a member selected from the group consisting of hydrogen, an alkyl group and a hydroxy group, wherein at least one of $R_2$ and $R_3$ must be a substituent other than hydrogen, and wherein the nitrogen atom numbered 1 and the carbon atom numbered 4 are attached to adjacent carbon atoms of the benzene nucleus B which are in para and meta position, respectively, to the azo bond.

5. The azo compounds having the formula:

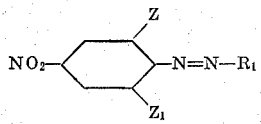

wherein $R_1$ represents the residue of a 1,2,3,4-tetrahydrocinnoline coupling component joined through the carbon atom in its 6-position to the azo bond and Z and $Z_1$ each represents a member selected from the group consisting of hydrogen, a halogen atom, a nitro, an alkylsulfone, a sulfonamide, a hydroxy, an alkoxy, an alkyl, a cyano, an alkylketo and a —COOY group wherein Y represents a member selected from the group consisting of hydrogen, an alkyl group and an alkali-forming metal.

6. The azo compounds having the formula:

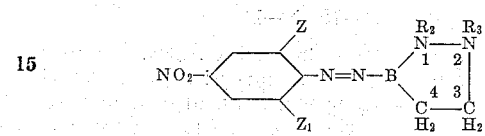

wherein Z and $Z_1$ each represents a member selected from the group consisting of hydrogen, a halogen atom, a nitro, an alkylsulfone, a sulfonamide, a hydroxy, an alkoxy, an alkyl, a cyano, an alkylketo and a —COOY group wherein Y represents a member selected from the group consisting of hydrogen, an alkyl group and an alkali-forming metal, B represents the residue of a benzene nucleus, $R_2$ and $R_3$ each represents a member selected from the group consisting of hydrogen, an acyl group, an alkyl group, a furyl group and a short chain unsaturated hydrocarbon group, wherein at least one of $R_2$ and $R_3$ must be a hydroxyalkyl group and wherein the nitrogen atom numbered 1 and the carbon atom numbered 4 are attached to adjacent carbon atoms of the benzene nucleus B which are in para and meta position, respectively, to the azo bond.

7. The azo dye compound having the formula:

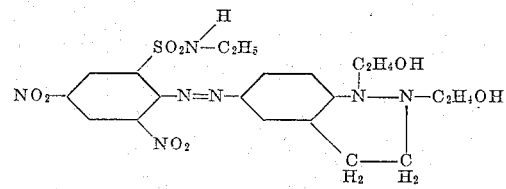

8. The azo compound having the formula:

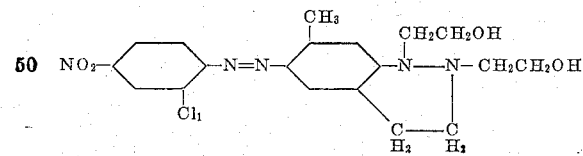

9. The azo compound having the formula:

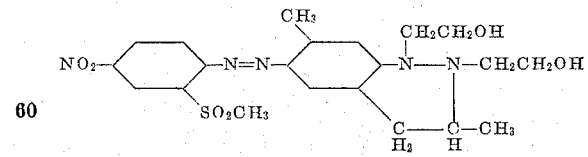

10. Textile material colored with an azo dye compound having the formula:

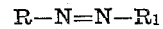

wherein R represents the residue of a member selected from the group consisting of an aryl nucleus of the benzene series, an aryl nucleus of the naphthalene series, a benzothiazole nucleus and a benzoxazole nucleus and $R_1$ represents the residue of a 1,2,3,4-tetrahydrocinnoline coupling component joined through the carbon atom in its 6-position to the azo bond.

11. Textile material colored with an azo dye compound having the formula:

$$R-N=N-R_1$$

wherein R represents the residue of a benzene nucleus and $R_1$ represents the residue of a 1,2,3,4-tetrahydrocinnoline coupling component joined through the carbon atom in its 6-position to the azo bond.

12. A cellulose acetate colored with a nuclear non-sulfonated azo dye compound having the formula:

$$R-N=N-R_1$$

wherein R represents the residue of a member selected from the group consisting of an aryl nucleus of the benzene series, an aryl nucleus of the naphthalene series, a benzothiazole nucleus and a benzoxazole nucleus and $R_1$ represents the residue of a 1,2,3,4-tetrahydrocinnoline coupling component joined through the carbon atom in its 6-position to the azo bond.

13. A cellulose acetate colored with a nuclear non-sulfonated azo dye compound having the formula:

$$R-N=N-R_1$$

wherein R represents the residue of a benzene nucleus and $R_1$ represents the residue of a 1,2,3,4-tetrahydrocinnoline coupling component joined through the carbon atom in its 6-position to the azo bond.

14. A cellulose acetate colored with a nuclear non-sulfonated azo dye compound having the formula:

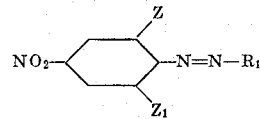

wherein $R_1$ represents the residue of a 1,2,3,4-tetrahydrocinnoline coupling component joined through the carbon atom in its 6-position to the azo bond and Z and $Z_1$ each represents a member selected from the group consisting of hydrogen, a halogen atom, a nitro, an alkylsulfone, a sulfonamide, a hydroxy, an alkoxy, an alkyl, a cyano, an alkylketo and a —COOY group wherein Y represents a member selected from the group consisting of hydrogen, an alkyl group and an alkali-forming metal.

15. The azo compounds having the formula:

$$R-N=N-R_1$$

wherein R represents the residue of a benzene nucleus and $R_1$ represents the residue of a 1,2,3,4-tetrahydrocinnoline coupling component having a hydroxyalkyl group attached to at least one of its nuclear nitrogen atoms, said 1,2,3,4-tetrahydrocinnoline coupling component being joined through the carbon atom in its 6-position to the azo bond.

JOSEPH B. DICKEY.